United States Patent
Lim

(10) Patent No.: US 10,844,901 B2
(45) Date of Patent: Nov. 24, 2020

(54) AIRFOIL JOURNAL BEARING HAVING IMPROVED TOP FOIL

(71) Applicant: NEUROS CO., LTD., Daejeon (KR)

(72) Inventor: Jaeman Lim, Daejeon (KR)

(73) Assignee: NEUROS CO., LTD., Daejeon (KR)

( * ) Notice: Subject to any disclaimer, the term of this patent is extended or adjusted under 35 U.S.C. 154(b) by 266 days.

(21) Appl. No.: 16/071,282

(22) PCT Filed: Jan. 12, 2017

(86) PCT No.: PCT/KR2017/000419
§ 371 (c)(1),
(2) Date: Jul. 19, 2018

(87) PCT Pub. No.: WO2017/131368
PCT Pub. Date: Aug. 3, 2017

(65) Prior Publication Data
US 2020/0240464 A1     Jul. 30, 2020

(30) Foreign Application Priority Data

Jan. 26, 2016   (KR) .................. 10-2016-0009511

(51) Int. Cl.
*F16C 17/02* (2006.01)
*F16C 43/02* (2006.01)
*F16C 32/06* (2006.01)

(52) U.S. Cl.
CPC ............ *F16C 17/024* (2013.01); *F16C 43/02* (2013.01); *F16C 32/0603* (2013.01); *F16C 2300/22* (2013.01)

(58) Field of Classification Search
CPC .................................................. F16C 17/024
See application file for complete search history.

(56) References Cited

U.S. PATENT DOCUMENTS

| 4,262,975 A * | 4/1981 | Heshmat | F16C 17/024 384/119 |
| 6,726,365 B2 * | 4/2004 | Shimizu | F16C 17/024 384/103 |
| 7,056,025 B2 * | 6/2006 | Nakata | F16C 17/024 384/103 |

FOREIGN PATENT DOCUMENTS

| JP | 2002-372042 A | 12/2002 |
| JP | 2005-233427 A | 9/2005 |

(Continued)

OTHER PUBLICATIONS

International Search Report of PCT/KR2017/000419 which is the parent application and its English translation—4 pages, (dated Apr. 12, 2017).

(Continued)

*Primary Examiner* — James Pilkington
(74) *Attorney, Agent, or Firm* — Knobbe Martens Olson & Bear LLP

(57) ABSTRACT

An airfoil journal bearing includes a bearing housing having a hollow portion in which a rotor is disposed, and formed such that width-wise both sides are opened; a bump foil provided at an inner side of the bearing housing and formed in the circumferential direction thereof, and coupled and fixed to the bearing housing; and a top foil provided at an inner side of the bump foil and formed along the circumferential direction thereof, and of which one side is coupled and fixed to the bearing housing. The top foil comprises: an outer top foil, an inner top foil and an intermediate top foil interposed between the outer top foil and the inner top foil.

15 Claims, 15 Drawing Sheets

(56) References Cited

FOREIGN PATENT DOCUMENTS

| JP | 2012-193833 | A | 10/2012 |
| KR | 10-2009-0043161 | A | 5/2009 |
| KR | 10-1068542 | B1 | 9/2011 |
| KR | 10-2013-0024405 | A | 3/2013 |
| WO | 2015/005547 | A1 | 1/2015 |
| WO | 2017/043880 | A1 | 3/2017 |

OTHER PUBLICATIONS

Extended European Search Report of corresponding EP Patent Application No. 17744490.8—9 pages (dated Jul. 25, 2019).

* cited by examiner

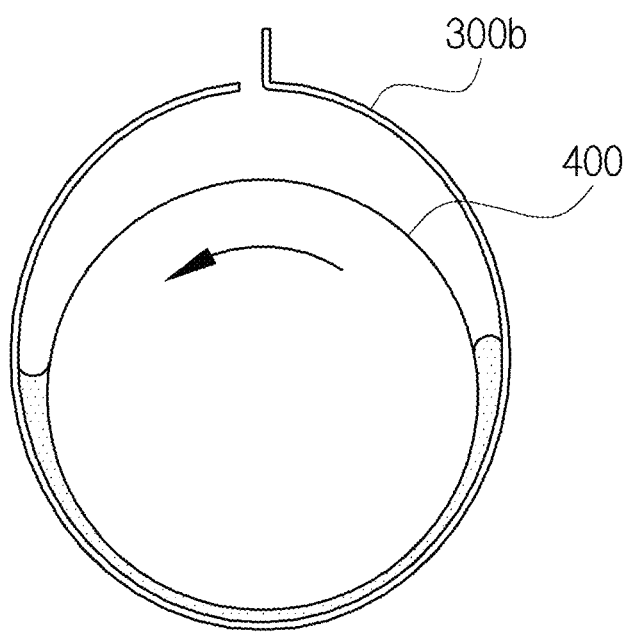

[FIG. 7]
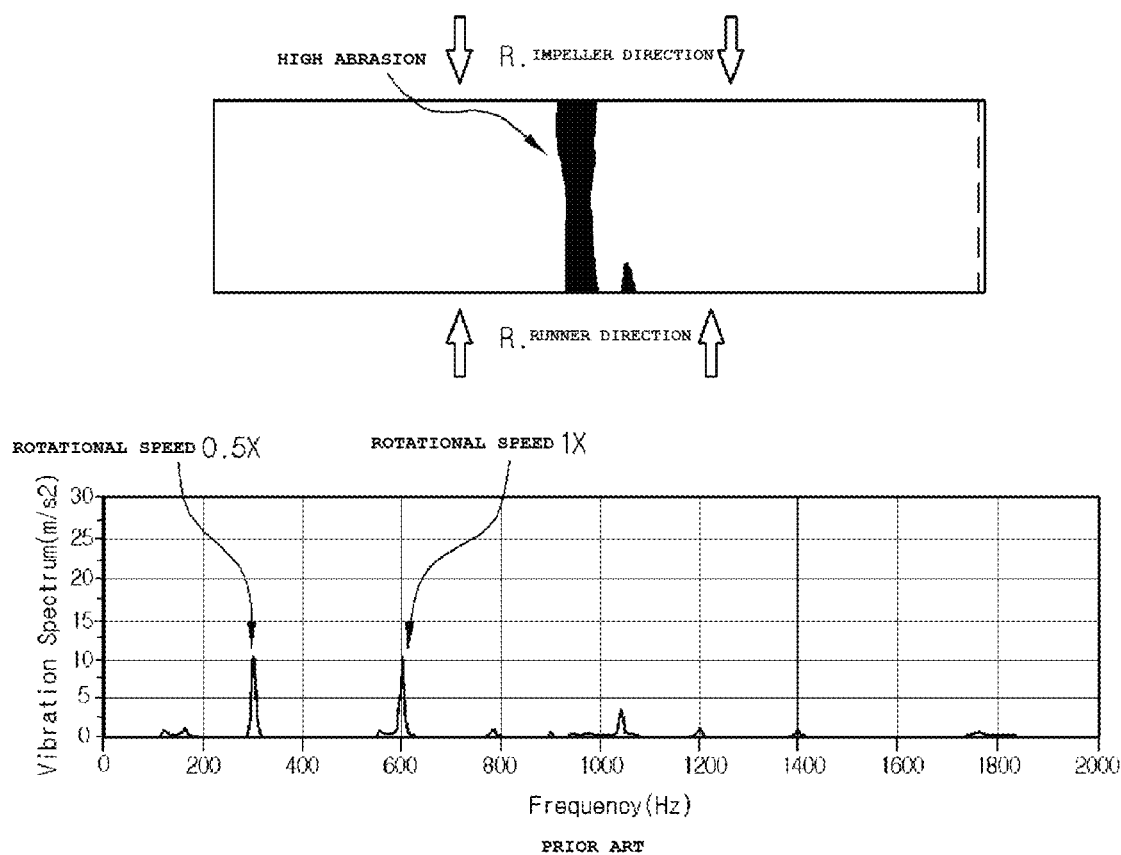
PRIOR ART

[FIG. 8]
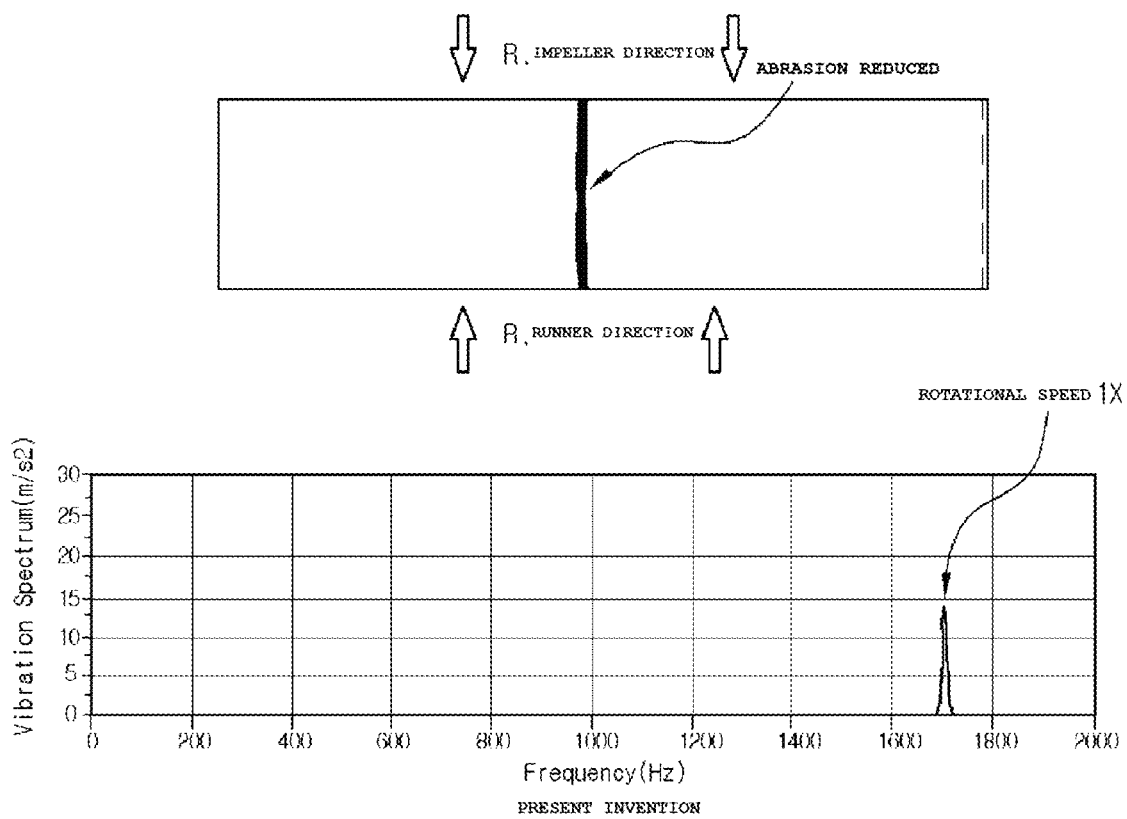
PRESENT INVENTION

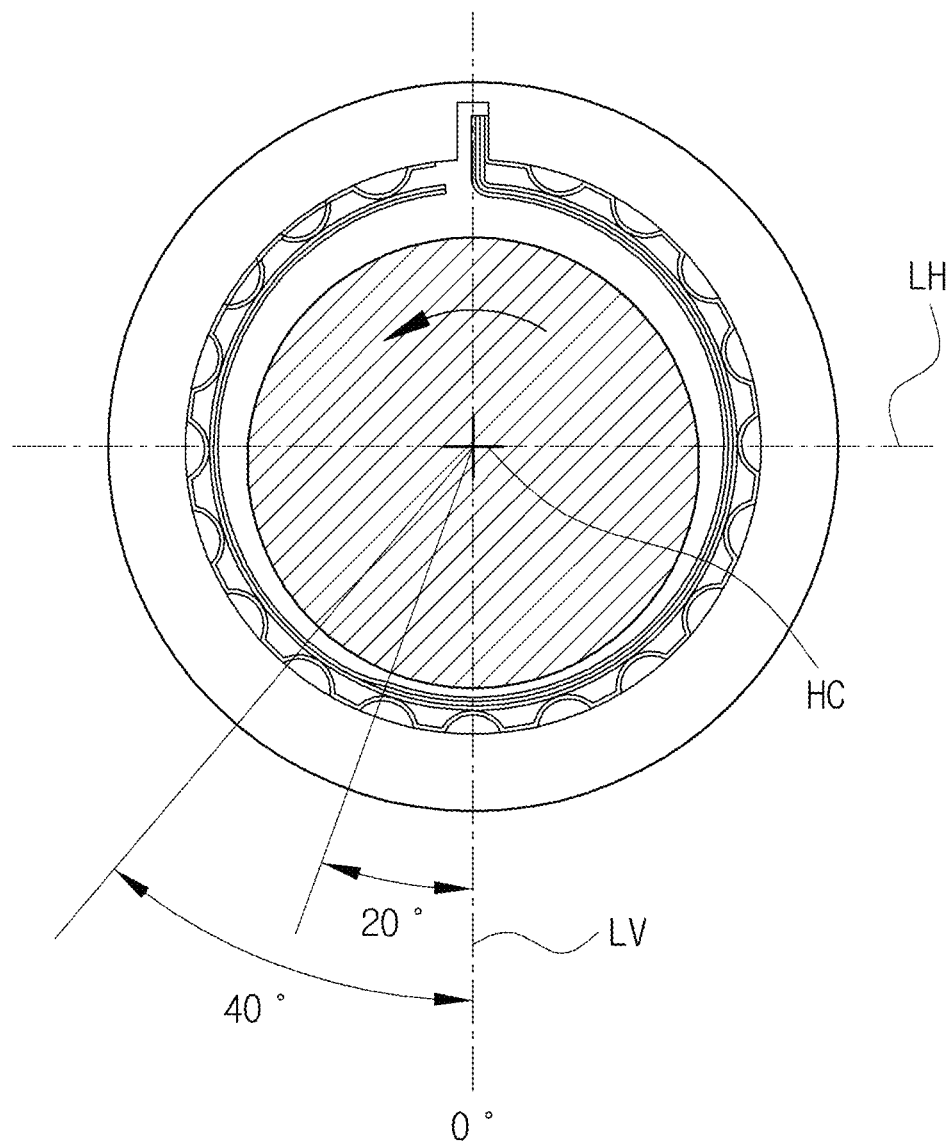
[FIG. 9]

[FIG. 10]
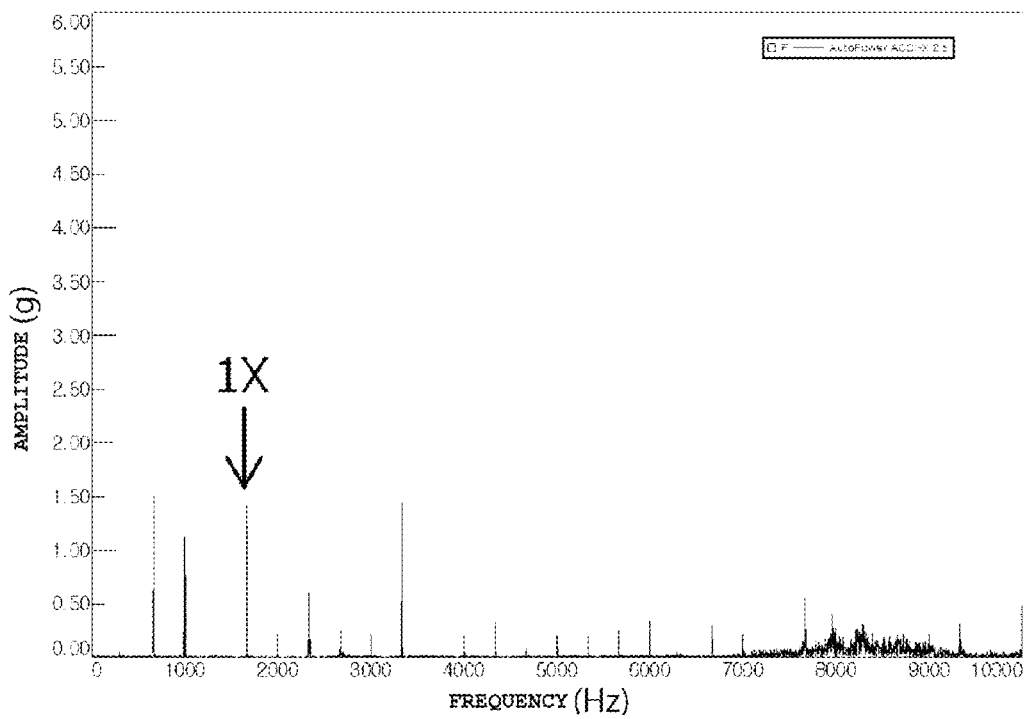
ANGLE AT WHICH FREE END OF INTERMEDIATE TOP FOIL IS FORMED : 20°
[FIG. 11]
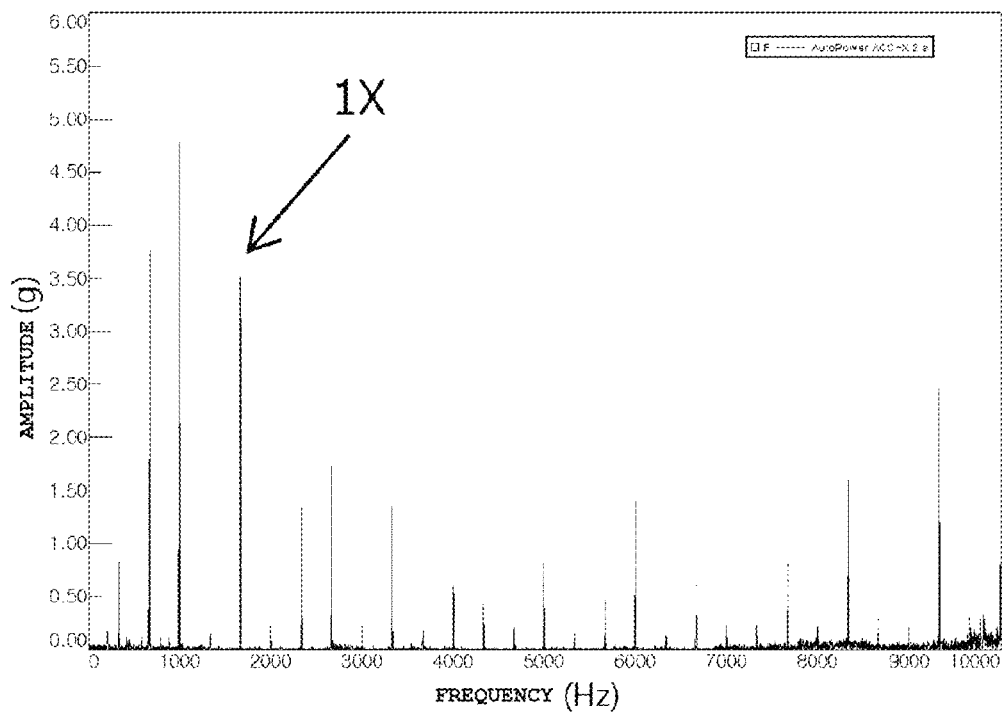
ANGLE AT WHICH FREE END OF INTERMEDIATE TOP FOIL IS FORMED : 25°

[FIG. 12]
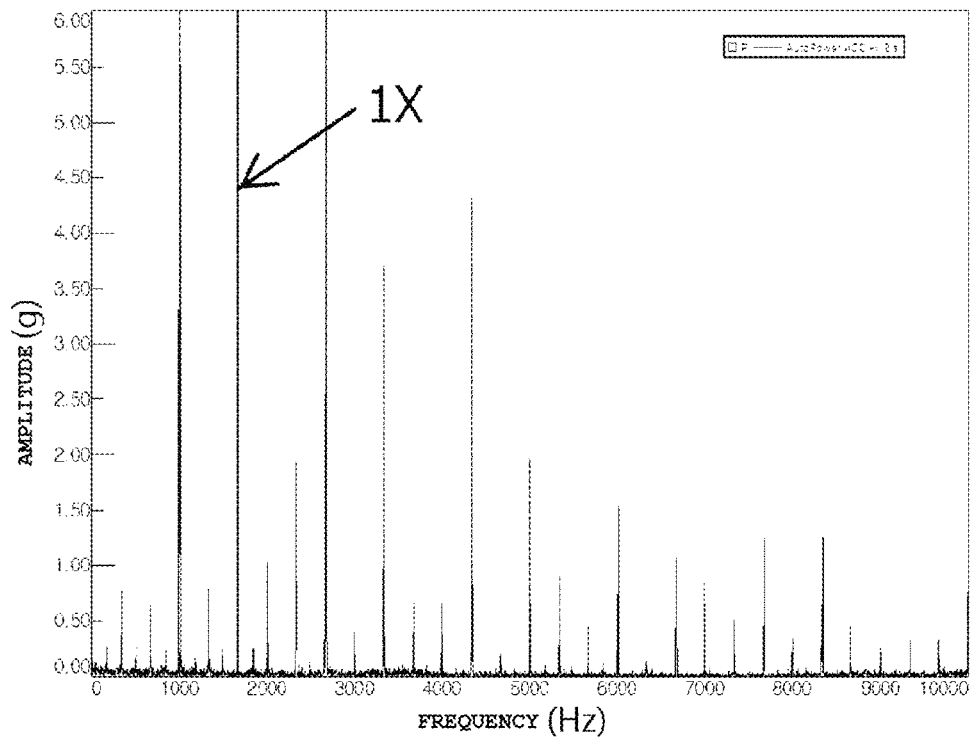
ANGLE AT WHICH FREE END OF INTERMEDIATE TOP FOIL IS FORMED : 180°
[FIG. 13]
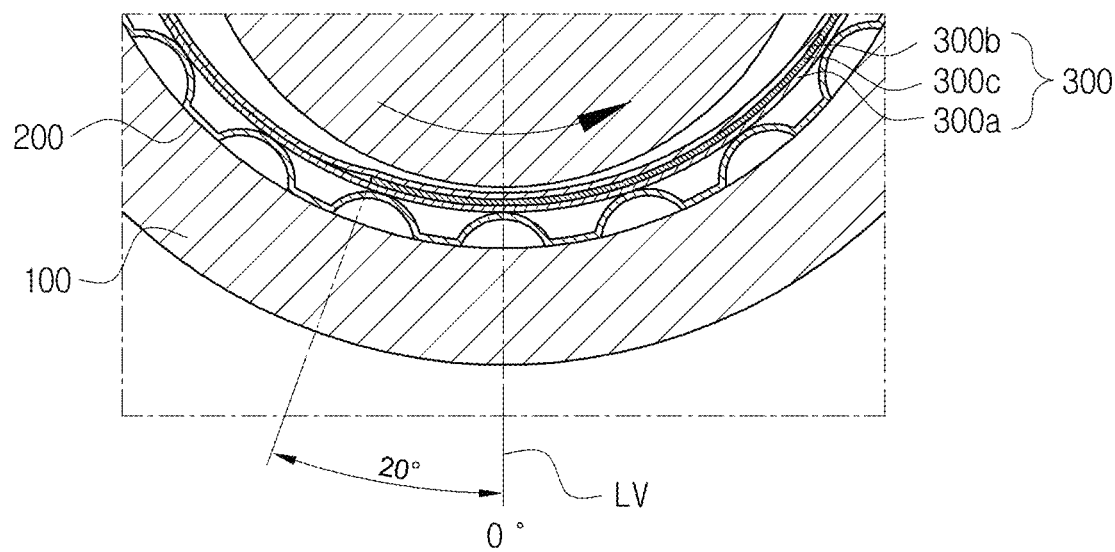

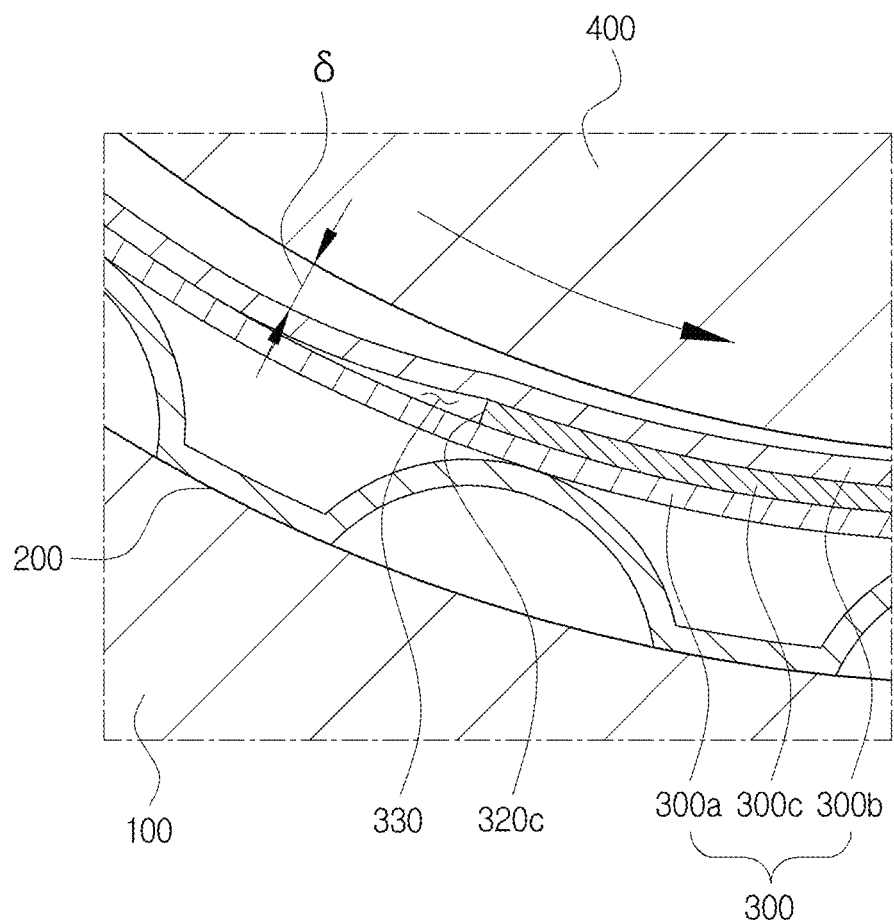
[FIG. 14]

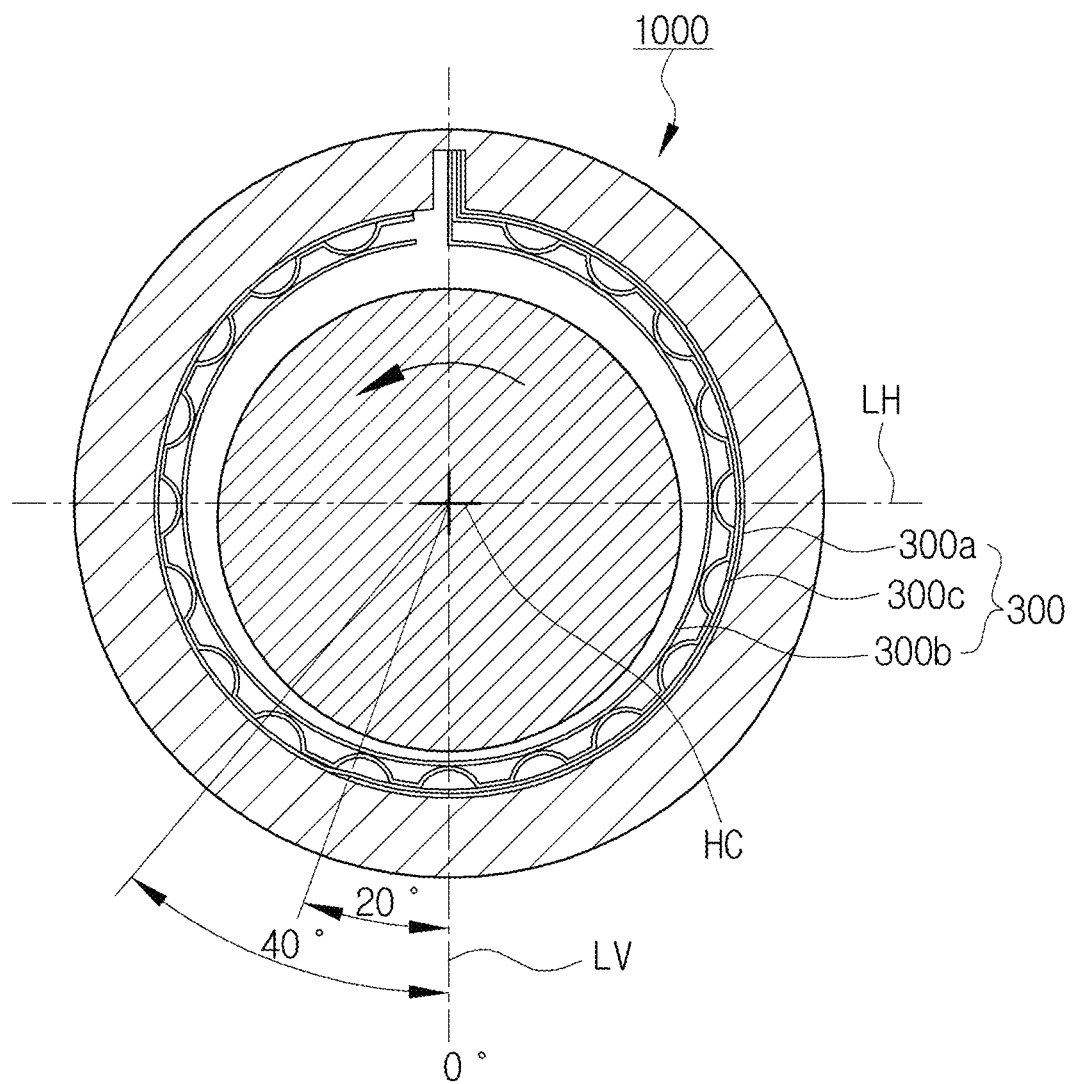
[FIG. 15]

[FIG. 16]
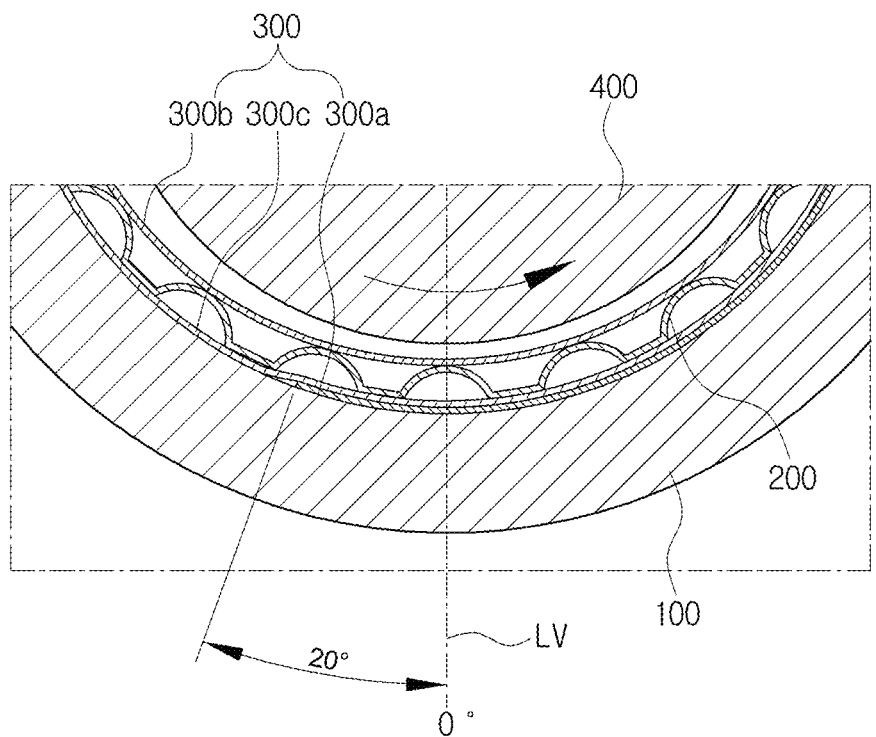
[FIG. 17]
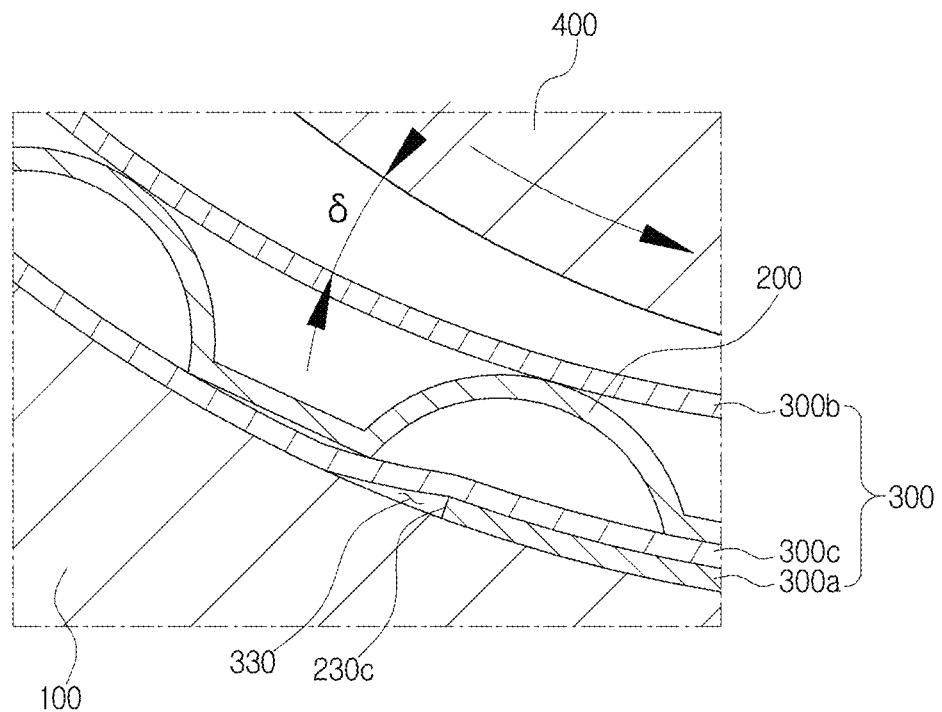

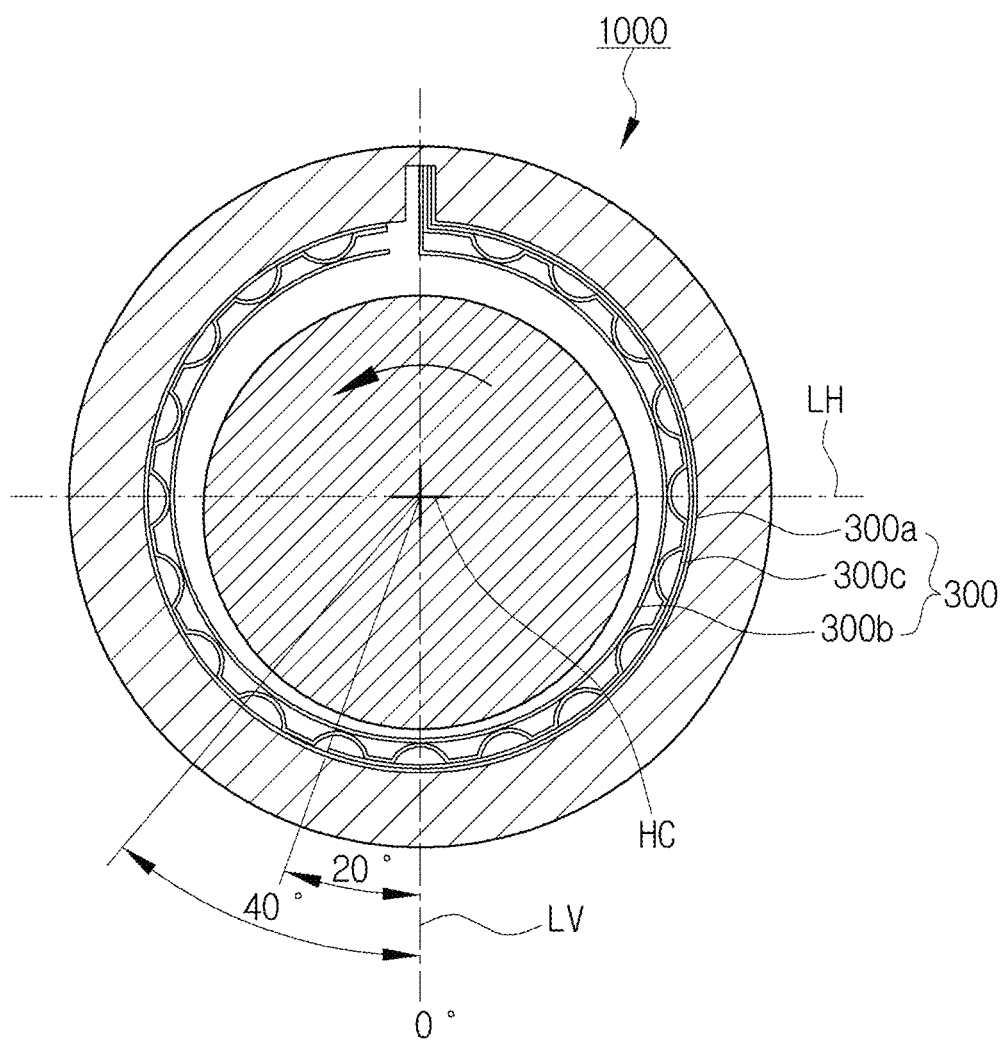
[FIG. 18]

[FIG. 19]
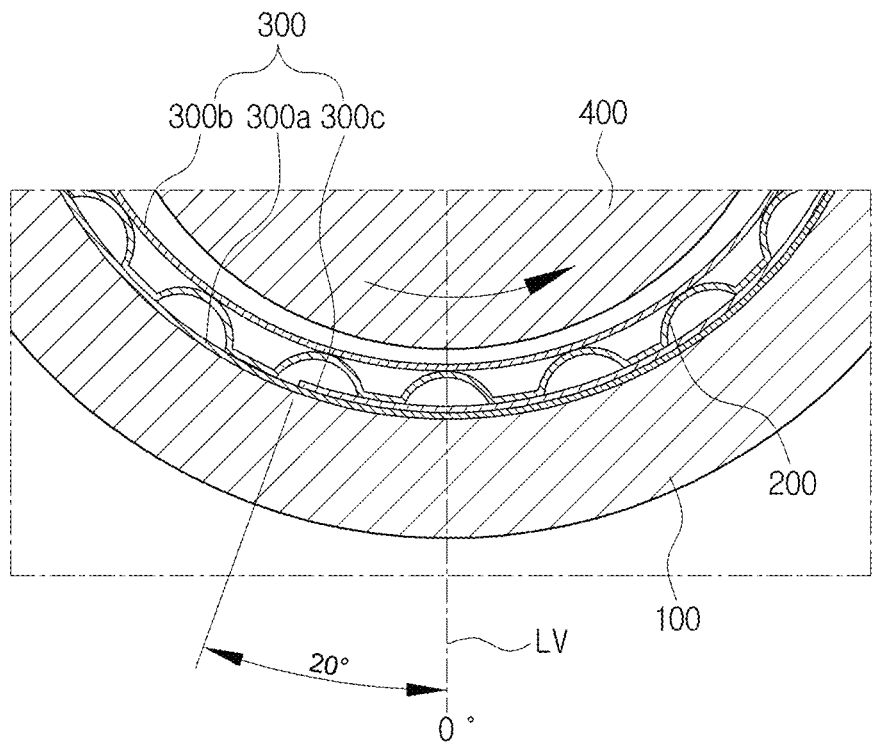
[FIG. 20]
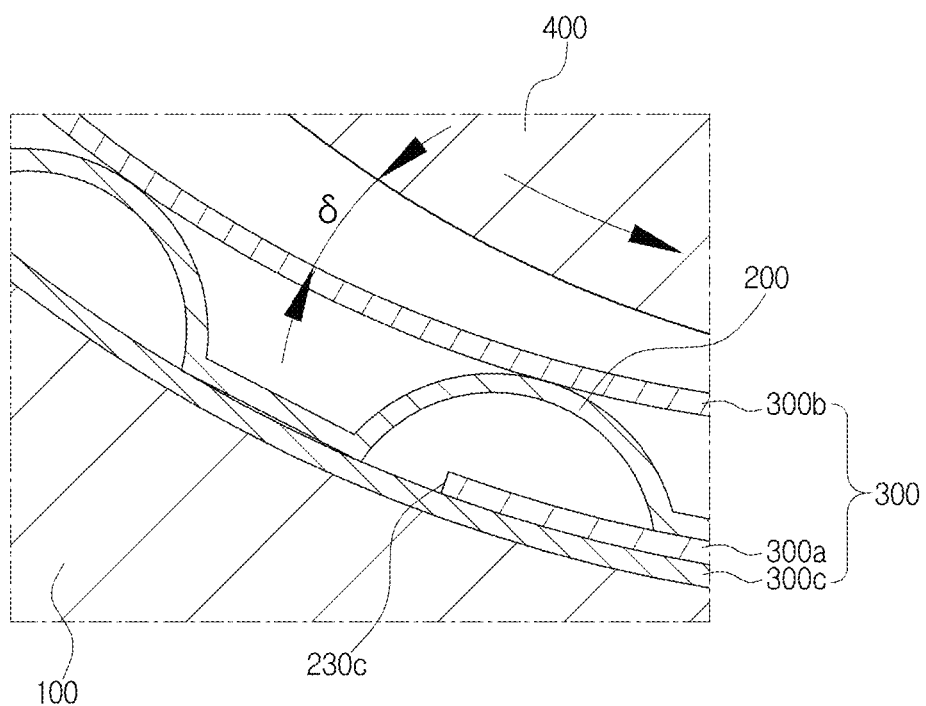

AIRFOIL JOURNAL BEARING HAVING IMPROVED TOP FOIL

BACKGROUND

Technical Field

The present invention relates to an airfoil journal bearing for supporting load of a rotor in a radial direction by pressure of air formed with rapid rotation of the rotor, and more particularly, to an airfoil journal bearing having an improved top foil for reducing a width by which a rotor moves in a left and right direction during rotation of the rotor and increasing a pressing angle between the rotor and the top foil to allow the rotor to float at low rotational speed and to reduce abrasion and vibration of the top foil.

Background Art

A bearing is a mechanical element that fixes a rotating shaft to a predetermined position and, simultaneously enables the shaft to rotate while supporting its own load of the shaft and load applied to the shaft.

An airfoil bearing among bearings is a bearing for supporting load by allowing air that is a fluid with viscosity to be introduced between a rotor and a foil that contacts a bearing disc to form pressure along with rapid rotation of a rotor (or rotating shaft). In addition, an airfoil journal bearing among airfoil bearings is a bearing configured to support load of a rotor in a radial direction that is a perpendicular direction to the rotor.

In this case, as shown in FIG. 1, a general airfoil journal bearing may be configured in such as way that a bump foil 20 is installed along a circumferential internal surface 12 of a hollow portion 11 of a bearing housing 10, a top foil 30 is disposed inside the bump foil 20, and a rotor 40 (or a rotating shaft) is disposed inside the top foil 30 and rotates in a state in which an inner circumference of the top foil 30 and an outer circumference of the rotor 40 are spaced apart from each other. Here, the bump foil 20 and the top foil 30 may each include a bent portion formed by bending a circumferential end thereof in an outer radial direction, and bent portions 21 and 31 may be coupled to each other to be inserted into a slot 13 formed in the bearing housing 10 to prevent the bump foil 20 and the top foil 30 from rotating or slipping in a circumferential direction and to fix the bump foil 20 and the top foil 30 to the bearing housing 10.

Here, when the rotor 40 rotates, pressure may be formed by air present between the top foil 30 and the rotor 40 and the rotor 40 may rotate in a state in which the rotor 40 is spaced apart from the top foil 30, as shown in the drawing. That is, when the rotor 40 is stationary, a lower side of the rotor 40 is supported by the top foil 30 due to its own load of the rotor 40 and, when the rotor 40 rotates, the rotor 40 may rotate in a state in which the rotor 40 floats on the top foil 30.

In this case, dynamic pressure of air is formed when the rotor 40 rotates and, in this case, dynamic pressure formed at left and right sides of the rotor is not uniform and a gap formed between the rotor and the top foil is increased. Accordingly, conventionally, rotation accuracy and dynamic characteristics of a rotor are degraded due to a large width by which the rotor is moved in a left and right direction.

When the rotor needs to rotate at high speed due to a small pressing angle between the top foil 30 and the rotor 40, the rotor floats on a top foil and, thus, it is disadvantageous in that friction between the top foil and the rotor is increased and vibration is serious.

[Cited Reference] [Patent Document] KR 10-1068542 B1 (Sep. 22, 2011)

SUMMARY

An object of the present invention is to provide an airfoil journal bearing for supporting load of a rotor in a radial direction by pressure of air formed along with rapid rotation of the rotor, and, in this case, the airfoil journal bearing includes an improved top foil for reducing a width by which a rotor rotates in a left and right direction during rotation of the rotor and increasing a pressing angle between the rotor and the top foil to allow the rotor to float at low rotational speed and to reduce abrasion and vibration of the top foil.

In one general aspect, an airfoil journal bearing having an improved top foil includes a bearing housing including a hollow portion which is formed therein and in which a rotor is disposed and having width-direction opposite sides that are formed to be open, a bump foil disposed inside the bearing housing, formed in a circumferential direction, and fixedly coupled to the bearing housing, and a top foil disposed inside the bump foil, formed in a circumferential direction, and having one side fixedly coupled to the bearing housing, wherein the top foil includes an external top foil closely mounted to the bump foil and having one side and the other side that are disposed on the rotor, an internal top foil disposed inside the external top foil to contact the rotor and having one side and the other side that are disposed on the rotor, and an intermediate top foil interposed between the external top foil and the internal top foil and formed with a smaller length than the external top foil and the internal top foil in such a way that one side of the intermediate top foil is disposed on the rotor and the other end portion is disposed below the rotor.

The intermediate top foil may be formed in an opposite direction to a rotation direction of the rotor based on one side fixed to the bearing housing.

The other end portion of the intermediate top foil may be formed in the range of 0° to 40° based on a vertical central line of a lower portion from a center of the bearing housing.

A wedge-type spatial portion may be formed to be surrounded by the external top foil, the internal top foil, and the other end portion of the intermediate top foil.

The external top foil may be closely mounted on the bump foil, and the external top foil, the internal top foil, and the intermediate top foil may be closely mounted on each other except for a portion corresponding to the spatial portion.

The external top foil, the internal top foil, and the intermediate top foil may be inserted into the bearing housing while being wound and, then, are spread due to elasticity.

In another general aspect, an airfoil journal bearing having an improved top foil includes a bearing housing including a hollow portion which is formed therein and in which a rotor is disposed and having width-direction opposite sides that are formed to be open, a bump foil disposed inside the bearing housing, formed in a circumferential direction, and fixedly coupled to the bearing housing, and a top foil disposed inside the bump foil, formed in a circumferential direction, and having one side fixedly coupled to the bearing housing, wherein the top foil includes an external top foil closely mounted to an inner circumference of the bearing housing, disposed outside the bump foil, and having one side disposed on the rotor and the other end portion dispose below the rotor, an intermediate top foil interposed between the bump foil and the external top foil and having one side and the other side that are disposed on the rotor, and an internal top foil closely mounted to an internal side of the bump foil, included inside the bump foil to contact the rotor, and having one side and the other side that are disposed on the rotor, and wherein the external top foil has a shorter length than that of the intermediate top foil and the internal top foil.

The bump foil and the top foils may be closely formed to an outward side in a radial direction.

In another general aspect, an airfoil journal bearing having an improved top foil includes a bearing housing including a hollow portion which is formed therein and in which a rotor is disposed and having width-direction opposite sides that are formed to be open, a bump foil disposed inside the bearing housing, formed in a circumferential direction, and fixedly coupled to the bearing housing, and a top foil disposed inside the bearing housing, formed in a circumferential direction, and having one side fixedly coupled to the bearing housing, wherein the top foil includes an external top foil closely mounted to an inner circumference of the bearing housing, disposed outside the bump foil, and having one side and the other side that are disposed on the rotor, an intermediate top foil interposed between the bump foil and the external top foil and having one side disposed on the rotor and the other end portion disposed below the rotor, and an internal top foil closely mounted to an internal side of the bump foil, included inside the bump foil to contact the rotor, and having one side and the other side that are disposed on the rotor, and wherein the intermediate top foil has a shorter length than that of the external top foil and the internal top foil.

The bump foil and the top foils may be closely formed to an outward side in a radial direction.

According to the present invention, an airfoil journal bearing having an improved top foil may be configured in such a way that pressure formed by air for supporting a rotor forms uniform band dynamic pressure by an enhanced configuration and shape of the top foil and, accordingly, a width by which the rotor is moved in a left and right direction may be reduced during rotation of the rotor, thereby advantageously enhancing dynamic characteristics of the rotor in a rotation region.

A pressing angle between the rotor and the internal top foil may be high and, thus, the rotor may float even at low rotational speed to reduce abrasion of the top foil and to advantageously reduce entire vibration of the rotor and the airfoil journal bearing.

BRIEF DESCRIPTION OF THE DRAWINGS

FIG. 6 is a schematic view showing dynamic pressure formation distribution of an airfoil journal bearing having an improved top foil according to the present disclosure.

FIG. 7 is a graph showing abrasion state and vibration FFT result of a top foil according to the prior art.

FIG. 8 is a graph showing abrasion state and vibration FFT result of an internal top foil according to the present invention.

FIG. 9 is a front view showing an angle range and a desired angle at which a free end of an intermediate top foil is formed according to the present invention.

FIGS. 10 through 12 are graphs showing a vibration test result depending on an angle at which a free end of an intermediate top foil is formed according to the present invention.

FIGS. 13 and 14 are enlarged views showing a free end of an intermediate top foil and a spatial portion formed by the same according to the present invention.

FIGS. 15 through 17 are a front view and a partial enlarged view of an airfoil journal bearing having an improved top foil according to a second exemplary embodiment of the present invention.

FIGS. 18 through 20 are a front view and a partial enlarged view of an airfoil journal bearing having an improved top foil according to a third exemplary embodiment of the present invention.

DETAILED DESCRIPTION OF EMBODIMENTS

Hereinafter, an airfoil journal bearing having an improved top foil according to the present invention will be described in detail with reference to the accompanying drawings.

Figure 1:
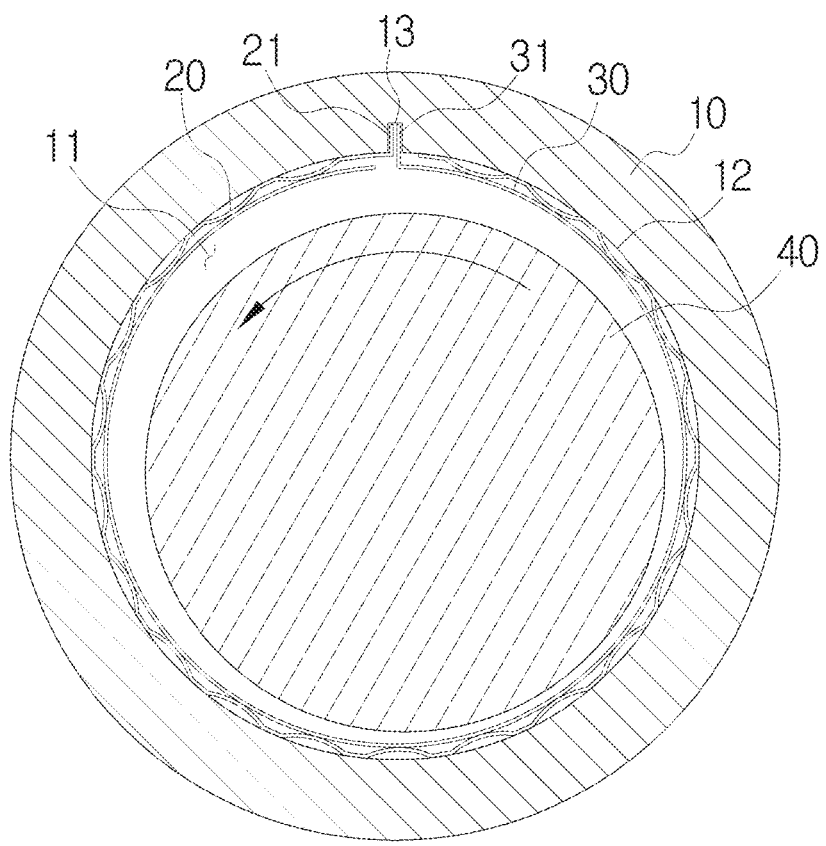
FIG. 1 is a schematic front view of a conventional airfoil journal bearing.
Figure 2:
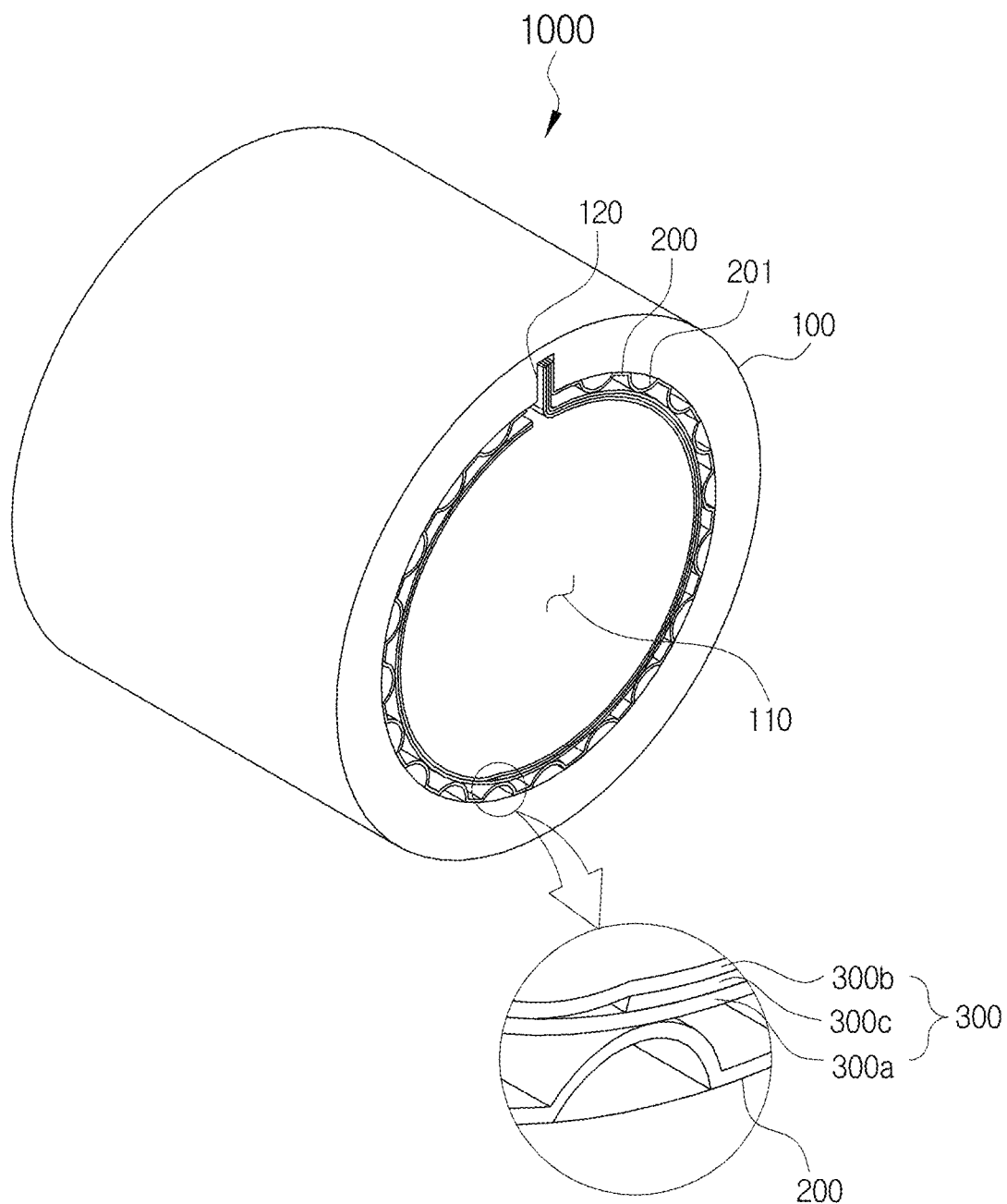
FIGS. 2 and 3 are an assembled perspective view and an exploded perspective view of an airfoil journal bearing having an improved top foil according to the present invention.
Figure 3:
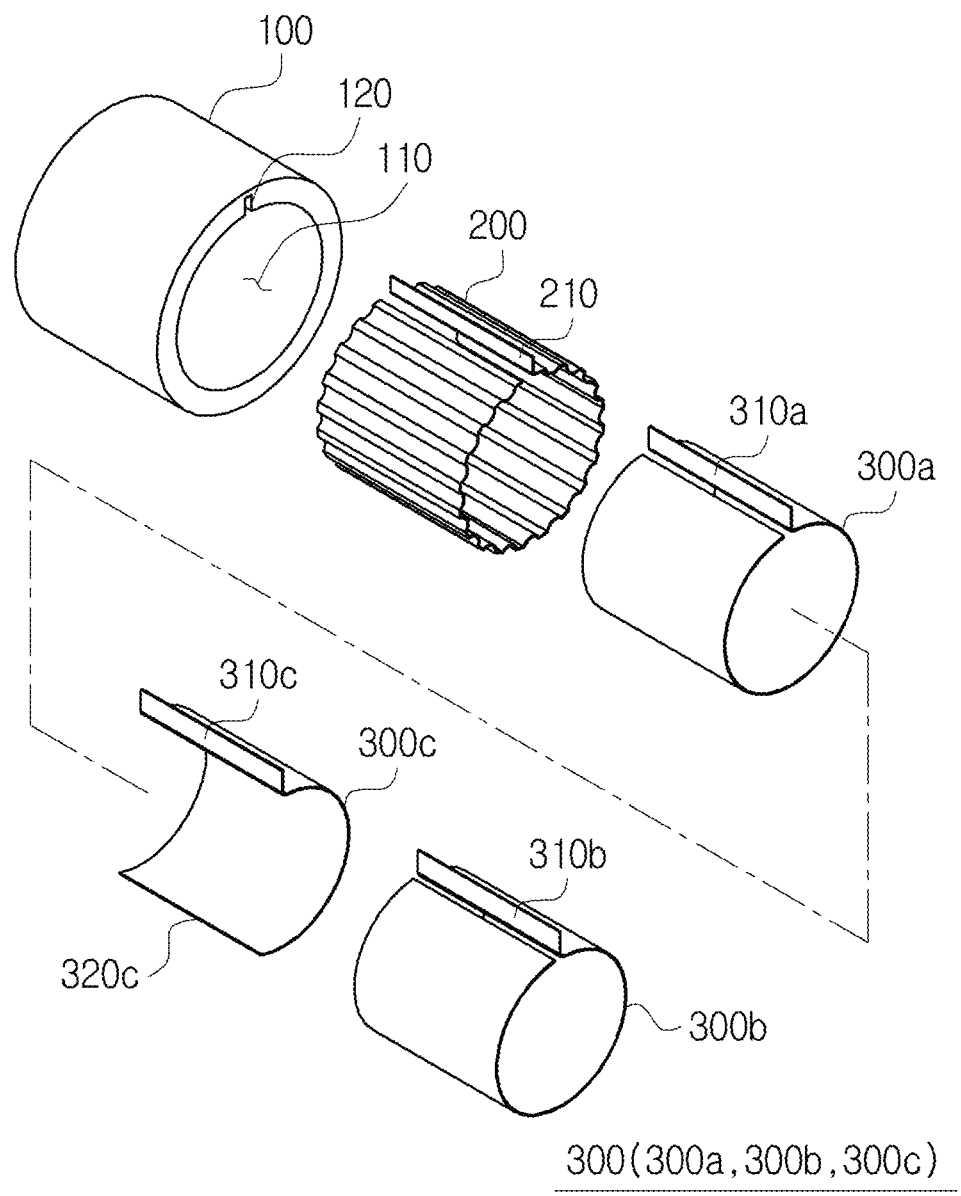
Figure 4:
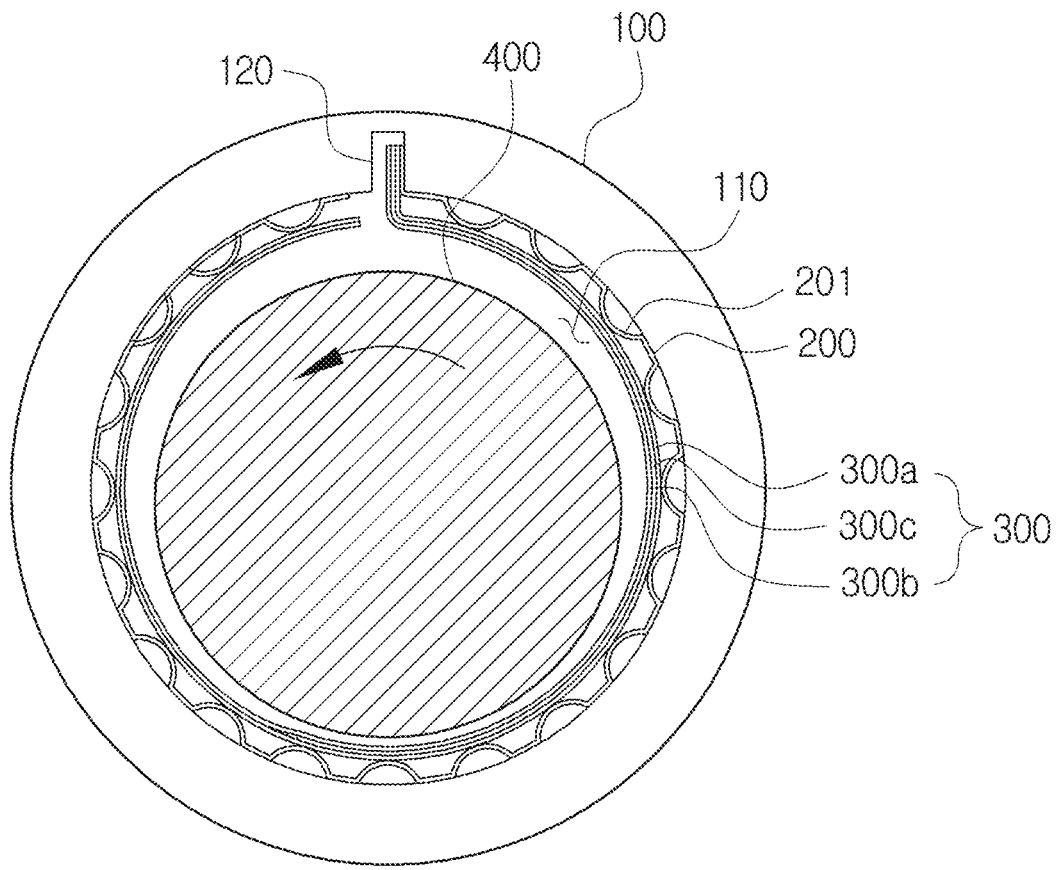
FIG. 4 is a front view showing an airfoil journal bearing having an improved top foil according to the present invention.

FIGS. 2 and 3 are an assembled perspective view and an exploded perspective view of an airfoil journal bearing having an improved top foil according to the present invention. FIG. 4 is a front view showing an airfoil journal bearing having an improved top foil according to the present invention.

First Exemplary Embodiment

As shown in the drawing, an airfoil journal bearing 1000 having an improved top foil according to the present invention may include a bearing housing 100 including a hollow portion 110 which is formed therein and in which a rotor 400 is disposed and having width-direction opposite sides that are formed to be open, a bump foil 200 disposed inside the bearing housing 100, formed in a circumferential direction, and fixedly coupled to the bearing housing 100, and a top foil 300 disposed inside the bump foil 200, formed in a circumferential direction, and having one side fixedly coupled to the bearing housing 100 and, in this case, the top foil 300 may include an external top foil 300*a* closely mounted to the bump foil 200 and having one side and the other side that are disposed on the rotor 400, an internal top foil 300*b* disposed inside the external top foil 300*a* to contact the rotor 400 and having one side and the other side that are disposed on the rotor, and an intermediate top foil 300*c* interposed between the external top foil 300*a* and the internal top foil 300*b* and formed with a smaller length than the external top foil 300*a* and the internal top foil 300*b* in such a way that one side of the intermediate top foil 300*c* is disposed on the rotor and the other end portion is disposed below the rotor 400.

The airfoil journal bearing 1000 having an improved top foil according to the present disclosure may broadly include the bearing housing 100, the bump foil 200, and the top foil 300 and, in this case, the top foil 300 may be formed in three and the intermediate top foil interposed between two top foils of the three top foils may be formed with a shorter length than the two remaining foils. The bump foil 200 and the top foil 300 may be disposed to be wound inside the hollow portion 110 of the bearing housing 100 and the top foil 300 may be disposed inside the bump foil 200. The rotor 400 may be disposed inside the top foil 300 to be inserted into and to penetrate through the top foil 300. In this case, a rotating shaft portion of the rotor 400 may be disposed inside the top foil 300. The external top foil 300a, the intermediate top foil 300c, and the internal top foil 300b of the top foil 300 may be sequentially stacked to an inner side from an outer side in a radial direction, and the external top foil 300a may be disposed to contact the bump foil 200 and the internal top foil 300b may be disposed to contact the rotor 400 and, thus, the external top foil 300a may be closely mounted to the bump foil 200 and the three top foils may be closely mounted to each other.

The bearing housing 100 may include the hollow portion 110 formed therein with opposite sides that penetrate therethrough in a central-axis direction, and a slot 120 may be formed at an internal upper portion of the bearing housing 100 to be connected to the hollow portion 110. In addition, like the hollow portion 110, the slot 120 may be formed with opposite sides that penetrate therethrough in a central-axis direction and a penetrating direction of the hollow portion and the slot may be a width direction of the bearing housing. The bearing housing 100 may have an inner circumference formed in a circular shape.

The bump foil 200 may be closely mounted on the inner circumference of the hollow portion 110 of the bearing housing 100 to be disposed in a circumferential direction, and the bump foil 200 may be shaped like a thin plate and may include a plurality of elastic bumps 201 that protrude to be convex in an inner radial direction. The top foil 300 may be shaped like a thin plate and an external surface of the external top foil 300a in a radial direction may be closely mounted to the elastic bumps 201. In this case, the bump foil 200 may include a bent portion 210 formed by bending a circumferential end thereof in an outer radial direction, and the bent portion 210 may be inserted into and fixed to the slot 120 to prevent the bump foil 200 from rotating or moving. Similarly, the three top foils 300 may also include a bent portion 310 formed by bending a circumferential end thereof in an outer radial direction, and the bent portion 310 may be disposed to be inserted into the slot 120. Accordingly, the bent portion 210 of the bump foil 200 and bent portions 310a, 310b, and 310c of the three top foils 300 may be inserted into and coupled to the slot 120 of the bearing housing 100 and, thus, the bump foil 200 and the top foil 300 may be fixed to the bearing housing 100. Alternatively, the bump foil 200 and the top foil 300 may be fixedly coupled to the bearing housing 100 via welding or may be fixedly coupled to the bearing housing 100 using various other methods.

Here, the external top foil 300a and the internal top foil 300b of the three top foils 300 may be configured in such a way that the bent portions 310a and 310b corresponding to one end are inserted into and fixed to the slot 120 formed at an internal upper portion of the bearing housing 100 and may extend in a circumferential direction in an opposite direction to a rotation direction of the rotor 400 based on the fixed bent portions 310a and 310b to entirely surround the rotor 400 and, accordingly, the other end may be slightly spaced apart from the bent portion and may be formed as a free end without being fixed to the bearing housing 100. In this case, like the external top foil 300a and the internal top foil 300b, the intermediate top foil 300c may be configured in such a way that the bent portion 310c corresponding to one end is inserted into and fixed to the slot 120 formed at the internal upper portion of the bearing housing 100 and may extend in a circumferential direction in an opposite direction to a rotation direction of the rotor 400 based on the fixed bent portion 310c. In addition, a length of the external top foil 300a and the internal top foil 300b may be formed with a shorter length than that of the intermediate top foil 300c to surround an approximately half of the rotor 400 and, thus, the other end of the intermediate top foil 300c may be formed as a free end 320c that is not fixed and may be formed below the rotor 400. That is, the external top foil 300a and the internal top foil 300b may have one side fixedly coupled to the slot 120 formed on the bearing housing 100 and the other side disposed on the rotor 400 and, in this case, the opposite sides may be spaced apart from each other and may be formed at an angle less than 360 degrees not to overlap with each other. Similarly, the intermediate top foil 300c may have one side fixedly coupled to the slot 120 formed at an upper portion of the bearing housing 100 and the other end portion disposed below the rotor 400.

Accordingly, as described above, the internal top foil 300b may be formed in a similar shape to an oval shape but not a circular shape by the intermediate top foil 300c with a relatively short length. That is, an internal shape of the internal top foil 300b may have a smaller interval in a left and right direction than an interval in an up and down direction to have a similar shape to an oval shape.

Figure 5:
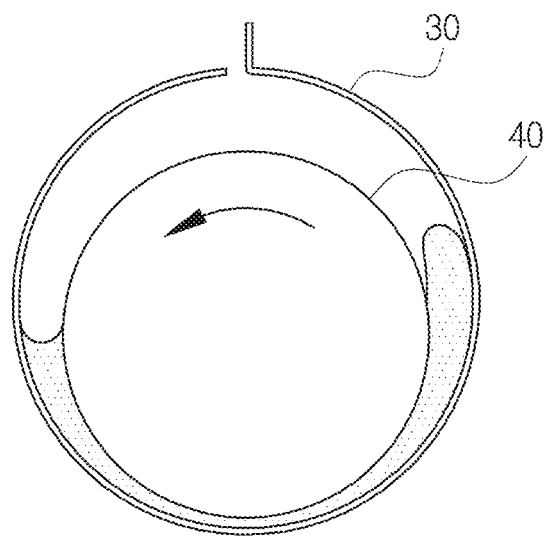
FIG. 5 is a schematic view showing dynamic pressure formation distribution of a conventional airfoil journal bearing.

Accordingly, as shown in FIG. 5, conventionally, a top foil 30 that contacts the rotor is configured in a circular shape and, thus, dynamic pressure at left and right sides of the rotor, which is formed during rotation of the rotor 40, is not be uniform and a height difference of dynamic pressure distribution is high, and a gap between the rotor and the top foil in a left and right direction is largely formed. Accordingly, conventionally, rotation accuracy and dynamic characteristics of the rotor are degraded due to a large width by which the rotor is moved in a left and right direction.

On the other hand, as shown in FIG. 6, an airfoil journal bearing having an improved top foil according to the present invention may be configured in such a way that pressure formed by air for supporting a rotor forms uniform band dynamic pressure, a height difference of dynamic pressure distribution is relatively low due to an enhanced configuration and shape of a top foil, and a gap between the rotor and an internal side of the top foil in a left and right direction is relatively small and, accordingly, a width by which the rotor is moved in left and right direction may be reduced during rotation of the rotor, thereby advantageously enhancing dynamic characteristics of the rotor in a rotation region.

As a result of a comparison experiment between a conventional airfoil journal bearing with a circular top foil and an airfoil journal bearing with an improved top foil according to the present invention, in a conventional case shown in FIG. 7, abrasion of a top foil is high and 0.5× component of rotational speed as an instable vibration component and 1× component of rotational speed are generated together to cause serious vibration in a rotation-vibration FFT transform graph along with rotation of a rotor, but, as seen from FIG. 8, according to the present invention, abrasion of an internal top foil is significantly reduced and only 1× component of rotational speed of vibration components is generated to reduce vibration.

The intermediate top foil 300c may be formed with one side fixed onto the bearing housing 100 and the other end portion disposed below the rotor.

That is, as described above, the bent portion 310c that is one side (upper side) of the intermediate top foil 300c may be inserted into and fixed to the slot 120, the other (lower) end portion may be disposed below the rotor 400, and the intermediate top foil 300c may be disposed to surround approximately half of the right side of the rotor 400.

The intermediate top foil 300c may be formed in an opposite direction to a rotation direction of the rotor 400 based on one side fixed to the bearing housing 100.

That is, as shown in the drawing, the intermediate top foil 300c may be formed in the opposite direction to the rotation direction of the rotor 400, air that flows during rotation of the rotor 400 may be compressed to increase pressure in terms of a left portion based on the free end 320c of the intermediate top foil 300c, and a pressing angle δ that is an angle between the internal top foil 300b and the rotor 400 may be high.

Accordingly, the pressing angle between the rotor and the internal top foil may be high compared with the conventional and, thus, the rotor may float even at low rotational speed (rpm) to reduce abrasion of the internal top foil and to advantageously reduce entire vibration of the rotor and the airfoil journal bearing.

The other end portion of the intermediate top foil 300c may be formed in the range of 0° to 40° based on a vertical central line LV of a lower portion from the center HC of the bearing housing 100.

That is, as shown in FIG. 9, based on 0° that is a lower portion in a vertical direction in the center HC of the bearing housing 100, the intermediate top foil 300c may be formed to a half or more in a clockwise direction that is an opposite direction of a rotation direction of the rotor 400 and, when the free end 320c of the intermediate top foil 300c is formed in the range of 0° to 40°, an effect of reducing abrasion and vibration of the internal top foil 300b may be enhanced. In this case, when the free end 320c is formed to 20°, this is most desirable in terms of reduction of vibration. As seen from FIG. 10 that is a vibration graph obtained by performing test in an up and down direction during rotation of a rotor and, then, performing driving estimation during rotation of the rotor at rotational speed of 100,000 rpm according to Experimental Example, amplitudes of rotation frequency 1× vibration and sub, and high synchronous vibration components are relatively very small in a vibration graph in which the free end 320c of the intermediate top foil 300c is formed to 20°. On the other hand, as seen from FIG. 11, when the free end 320c of the intermediate top foil 300c is formed to 25°, amplitude of a vibration component is relatively increased and, as seen from FIG. 12, when the free end 320c of the intermediate top foil 300c is formed to 180°, amplitude of a vibration component is very high.

In addition, a wedge-type spatial portion 330 may be formed to be surrounded by the external top foil 300a, the internal top foil 300b, and the other end portion of the intermediate top foil 300c.

That is, as shown in FIGS. 13 and 14, the spatial portion 330 that is an empty space formed by disposing the external top foil 300a and the internal top foil 300b to be spaced apart from each other rather than being closely mounted to each other may be formed at a left portion of the free end 320c that is the other end portion of the intermediate top foil 300c, and the spatial portion 330 may be formed in a triangular shape or a wedge shape to increase the pressing angle δ between the internal top foil 300b and the rotor 400.

The external top foil 300a may be closely mounted to the bump foil 200 and the external top foil 300a, the internal top foil 300b, and the intermediate top foil 300c may be closely mounted on each other except for a portion corresponding to the spatial portion 330.

In this case, the external top foil 300a, the internal top foil 300b, and the intermediate top foil 300c may be inserted into the bearing housing 100 while being wound and, then, may be spread due to elasticity.

That is, as shown in the drawing, foils may be closely disposed to each other due to elasticity thereof, the foils may be closely disposed to each other due to pressure of air formed during rotation of the rotor 400, and the foils may be inserted into the bearing housing 100 while being wound and, then, may be spread and closely disposed to each other due to elasticity. Here, the wedge-type spatial portion 330 shown in the drawing may be easily formed and the pressing angle δ may be high due to elasticity of the internal top foil 300b.

As the bump foil 200 is inserted into the bearing housing 100 while being wound and, then, is spread due to elasticity, the bump foil 200 may be assembled to be closely mounted to the inner circumference of the bearing housing 100. The bump foil 200 may be formed in such a way that two bump foils or more overlap with each other. The bump foil 200 and the top foil 300 may be disposed to be wound in the same direction based on the bent portions 210 and 310, respectively and, may be included in the bearing housing 100 to be disposed at opposite sides.

Second Exemplary Embodiment

FIGS. 15 through 17 are a front view and a partial enlarged view of an airfoil journal bearing having an improved top foil according to a second exemplary embodiment of the present invention.

As shown in the drawing, an airfoil journal bearing having an improved top foil according to the present invention may include the bearing housing 100 including the hollow portion 110 which is formed therein and in which the rotor 400 is disposed and having width-direction opposite sides that are formed to be open, the bump foil 200 disposed inside the bearing housing 100, formed in a circumferential direction, and fixedly coupled to the bearing housing 100, and the top foil 300 disposed inside the bearing housing 100, formed in a circumferential direction, and having one side fixedly coupled to the bearing housing 100 and, in this case, the top foil 300 may include the external top foil 300a closely mounted to the inner circumference of the bearing housing 100, disposed outside the bump foil 200, and having one side disposed on the rotor 400 and the other end portion dispose below the rotor 400, the intermediate top foil 300c interposed between the bump foil 200 and the external top foil 300a and having one side and the other side that are disposed on the rotor 400, and the internal top foil 300b closely mounted to an internal side of the bump foil 200, included inside the bump foil 200 to contact the rotor 400, and having one side and the other side that are disposed on the rotor 400 and, in this case, the external top foil 300a may have a shorter length than that of the intermediate top foil 300c and the internal top foil 300b.

The second exemplary embodiment may be formed by disposing the two top foils in the bearing housing 100 and the bump foil 200, disposing only one top foil inside the bump foil 200, and forming the external top foil 300a but not an intermediate top foil with a shorter length than the other two top foils, from the aforementioned first exemplary embodiment and, accordingly, one side of the external top foil 300a may be disposed on the rotor 400 and the other end portion may be disposed below the rotor 400.

Here, a radial-direction portion by which an external side of the bump foil 200 is supported may be changed by the external top foil 300a with a relatively short length. That is, a radial-direction portion in which the bump foil 200 is disposed may be formed with a relatively small size in a portion in which the external top foil 300a is present, and a radial-direction portion in which the bump foil 200 is disposed may be formed with a relatively large size in a portion in which the external top foil 300a is not present. Accordingly, a radius of the internal top foil 300b disposed inside the bump foil 200 may also be changed according to whether the external top foil 300a is present.

The bump foil 200 and the top foils 300a, 300b, and 300c may be closely formed to an outward side in a radial direction. In this case, like in the first exemplary embodiment, the wedge-type spatial portion may be formed and a spatial portion may be formed by the bearing housing, the intermediate top foil, and the other end portion of the external top foil.

Third Exemplary Embodiment

FIGS. 18 through 20 are a front view and a partial of an airfoil journal bearing having an improved top foil according to a third exemplary embodiment of the present invention.

As shown in the drawing, an airfoil journal bearing having an improved top foil according to the present invention may include the bearing housing 100 including the hollow portion 110 which is formed therein and in which the rotor 400 is disposed and having width-direction opposite sides that are formed to be open, the bump foil 200 disposed inside the bearing housing 100, formed in a circumferential direction, and fixedly coupled to the bearing housing 100, and the top foil 300 disposed inside the bearing housing 100, formed in a circumferential direction, and having one side fixedly coupled to the bearing housing 100 and, in this case, the top foil 300 may include the external top foil 300a closely mounted to the inner circumference of the bearing housing 100, disposed outside the bump foil 200, and having one side and the other side that are disposed on the rotor 400, the intermediate top foil 300c interposed between the bump foil 200 and the external top foil 300a and having one side disposed on the rotor 400 and the other end portion disposed below the rotor 400, and the internal top foil 300b closely mounted to an internal side of the bump foil 200, included inside the bump foil 200 to contact the rotor 400, and having one side and the other side that are disposed on the rotor 400 and, in this case, the intermediate top foil 300c may have a shorter length than that of the external top foil 300a and the internal top foil 300b.

The third exemplary embodiment may be formed by reversing the positions of the external top foil and the intermediate top foil from the aforementioned second exemplary embodiment. That is, the third exemplary embodiment may be configured by disposing the two top foils in the bearing housing 100 and the bump foil 200, disposing only one top foil inside the bump foil 200, and forming the intermediate top foil with a shorter length than the other two top foils and, thus, one side of the intermediate top foil 300c is disposed on the rotor 400 and the other end portion is disposed below the rotor 400.

The bump foil 200 and the top foils 300a, 300b, and 300c may be closely formed to an outward side in a radial direction. In this case, a wedge-type spatial portion in the first exemplary embodiment may not be formed.

As such, like in the first exemplary embodiment, in the second and third exemplary embodiments of the present invention, the internal top foil 300b may also be formed in a similar shape to an oval shape but not a circular shape by the intermediate top foil or the external top foil with a relatively short length and, thus, a width by which the rotor is moved in left and right direction may be reduced during rotation of the rotor, thereby enhancing dynamic characteristics of the rotor in a rotation region. In addition, the top foil with a relatively short length may be formed in the opposite direction to the rotation direction of the rotor 400, air that flows during rotation of the rotor 400 may be compressed to increase pressure in terms of a left portion based on the other end portion of the top foil with a short length, and a pressing angle δ that is an angle between the internal top foil 300b and the rotor 400 may be high.

Accordingly, the pressing angle between the rotor and the internal top foil may be high compared with the conventional and, thus, the rotor may float even at low rotational speed (rpm) to reduce abrasion of the internal top foil and to advantageously reduce entire vibration of the rotor and the airfoil journal bearing.

In addition, like in the aforementioned first exemplary embodiment, the second and third exemplary embodiments of the present invention may also be modified in various forms.

The present invention is not limited to the abovementioned exemplary embodiments, but may be variously applied. In addition, the present invention may be variously modified by those skilled in the art to which the present invention pertains without departing from the gist of the present invention claimed in the claims.

The invention claimed is:

1. An airfoil journal bearing, comprising:
a bearing housing including a hollow portion which is formed therein and in which a rotor is disposed and having width-direction opposite sides that are formed to be open;
a bump foil disposed inside the bearing housing, extending in a circumferential direction, and fixedly coupled to the bearing housing; and
a plurality of top foils disposed inside the bump foil, extending in a circumferential direction, and fixedly coupled to the bearing housing,
wherein the plurality of top foils comprise:
an external top foil contacting the bump foil and having a first end and a second end that are disposed above the rotor;
an internal top foil disposed inside the external top foil to contact the rotor and having a third end and a fourth end that are disposed above the rotor; and
an intermediate top foil interposed between the external top foil and the internal top foil and having a smaller length than the external top foil and the internal top foil in such a way that a fifth end of the intermediate top foil is disposed above the rotor and a sixth end of the intermediate top foil is disposed below the rotor.

2. The airfoil journal bearing of claim 1, wherein the intermediate top foil extends from the fifth end in an opposite direction to a rotation direction of the rotor.

3. The airfoil journal bearing of claim 2, wherein the sixth end of the intermediate top foil is positioned in a range of 0° to 40° with respect to a vertical central line passing a center of the bearing housing.

4. The airfoil journal bearing of claim 2, wherein a wedge-type spatial portion is surrounded by the external top foil, the internal top foil, and the sixth end of the intermediate top foil.

5. The airfoil journal bearing of claim 4, wherein the external top foil is contacting the bump foil; and
wherein the external top foil is contacting the intermediate top foil, the internal top foil is contacting the external top foil, and the intermediate top foil is contacting the internal top foil.

6. The airfoil journal bearing of claim 5, wherein the external top foil, the internal top foil, and the intermediate top foil have elasticity to be wound and spread such that the external top foil, the internal top foil, and the intermediate top foil are capable of being inserted into the bearing housing while being wound and spreading in the bearing housing due to elasticity.

7. The airfoil journal bearing of claim 1, wherein the bearing housing comprises a slot, wherein the first end, the third end and the fifth end are fixed to the bearing housing in the slot.

8. An airfoil journal bearing, comprising:
a bearing housing including a hollow portion which is formed therein and in which a rotor is disposed and having width-direction opposite sides that are formed to be open;
a bump foil disposed inside the bearing housing, extending in a circumferential direction, and fixedly coupled to the bearing housing;
an external foil disposed inside the bearing housing, contacting an inner circumference of the bearing housing, disposed between the bump foil and the bearing housing, and having a first end disposed above the rotor and a second end disposed below the rotor;
an internal foil contacting an inner surface of the bump foil, disposed inside the bump foil to contact the rotor, and having a third end and a fourth end that are disposed above the rotor; and
an intermediate foil disposed between the bump foil and the external foil and having a fifth end and a sixth end that are disposed above the rotor,
wherein the external foil has a shorter length than that of the intermediate foil and the internal foil.

9. The airfoil journal bearing of claim 8, wherein each of the bump foil, the external foil, the internal foil and the intermediate foil have elasticity to make a contact with an immediately neighboring one of the bump foil, the external foil, the internal foil and the intermediate foil.

10. The airfoil journal bearing of claim 8, wherein the intermediate foil extends from the fifth end in an opposite direction to a rotation direction of the rotor.

11. The airfoil journal bearing of claim 8, wherein the bearing housing comprises a slot, wherein the first end, the third end and the fifth end are fixed to the bearing housing in the slot.

12. An airfoil journal bearing, comprising:
a bearing housing including a hollow portion which is formed therein and in which a rotor is disposed and having width-direction opposite sides that are formed to be open;
a bump foil disposed inside the bearing housing, extending in a circumferential direction, and fixedly coupled to the bearing housing;
an external foil contacting an inner circumference of the bearing housing, disposed between the bump foil and the bearing housing, and having a first end and a second end that are disposed above the rotor;
an internal foil contacting an internal side of the bump foil, disposed inside the bump foil to contact the rotor, and having a third end and a fourth end that are disposed above the rotor; and
an intermediate foil interposed between the bump foil and the external foil and having a fifth end disposed above the rotor and a sixth end disposed below the rotor; and
wherein the intermediate foil has a shorter length than that of the external foil and the internal foil.

13. The airfoil journal bearing of claim 12, wherein each of the bump foil, the external foil, the internal foil and the intermediate foil have elasticity to make a contact with an immediately neighboring one of the bump foil, the external foil, the internal foil and the intermediate foil.

14. The airfoil journal bearing of claim 12, wherein the external foil extends from the first end in an opposite direction to a rotation direction of the rotor.

15. The airfoil journal bearing of claim 12, wherein the bearing housing comprises a slot, wherein the first end, the third end and the fifth end are fixed to the bearing housing in the slot.

* * * * *